United States Patent [19]
Osborn et al.

[11] Patent Number: 5,785,626
[45] Date of Patent: Jul. 28, 1998

[54] SHIFTER WITH CABLE ADJUSTABLE MECHANISM

[75] Inventors: Charles Osborn, Spring Lake; Robert M. Medema, Muskegon; Andrew K. Ruiter, Spring Lake, all of Mich.

[73] Assignee: Grand Haven Stamped Products Division of JSJ Corporation, Grand Haven, Mich.

[21] Appl. No.: 811,607

[22] Filed: Mar. 5, 1997

Related U.S. Application Data

[60] Provisional application No. 60/012,874 Mar. 5, 1996.
[51] Int. Cl.⁶ .................................................. F16H 59/02
[52] U.S. Cl. ............................ 477/99; 192/44; 74/473.15
[58] Field of Search ........................... 477/99; 74/473.15, 74/473.25, 473.26; 192/44

[56] References Cited

U.S. PATENT DOCUMENTS

| | | |
|---|---|---|
| 3,151,496 | 10/1964 | Winchell . |
| 3,998,109 | 12/1976 | O'Brien . |
| 4,126,054 | 11/1978 | Langford et al. . |
| 4,333,361 | 6/1982 | Spease . |
| 4,546,665 | 10/1985 | Bieber . |
| 4,884,467 | 12/1989 | Martell . |
| 5,078,242 | 1/1992 | Ratke et al. ........................ 477/99 |
| 5,156,061 | 10/1992 | Ishizuki et al. . |
| 5,207,124 | 5/1993 | Anderson et al. . |
| 5,251,723 | 10/1993 | Rolinski et al. ................... 477/99 |
| 5,293,763 | 3/1994 | Asano et al. ...................... 477/99 |
| 5,402,870 | 4/1995 | Osborn et al. . |
| 5,489,246 | 2/1996 | Moody et al. ..................... 477/99 |
| 5,494,141 | 2/1996 | Osborn et al. . |
| 5,662,004 | 9/1997 | Osborn et al. ................. 74/473.15 |
| 5,695,249 | 12/1997 | Kataumi et al. ................... 192/4 A |
| 5,706,703 | 1/1998 | Kim ................................. 192/4 A |

OTHER PUBLICATIONS

Exhibit A discloses a prior art snap together cable assembly connector designed by another company; the date, the design, and the status of use being unknown.

*Primary Examiner*—Dirk Wright
*Attorney, Agent, or Firm*—Price, Heneveld, Cooper, DeWitt & Litton

[57] ABSTRACT

A shifter assembly for a shifting a vehicle transmission via a telescopeable transmission shift cable is provided. The shifter assembly includes a base, a shift lever pivoted to the base, a cable-actuating arm pivotally attached to the shift lever and adapted for operative connection to the transmission shift cable, and a coupler for securing the cable-actuating arm to the shift lever in an adjusted position. The coupler is movable between an adjustment-permitting position where a length variation in the transmission cable can be accommodated, and an interlocked position where the cable-actuating arm is secured to the shift lever. A manual, pawl-biased actuator on the shift lever is adapted to engage the coupler to move the coupler from the installed position to the interlocked position when the transmission cable is at a desired position. The shifter assembly includes a park lock device or a brake-ignition-transmission-shift-interlock (BITSI) device for controlling movement of the shift lever out of park, and further optionally includes a pull wire that renders the BITSI device inoperable until a desired time during assembly, at which time the pull wire is pulled to make the BITSI operable.

39 Claims, 12 Drawing Sheets

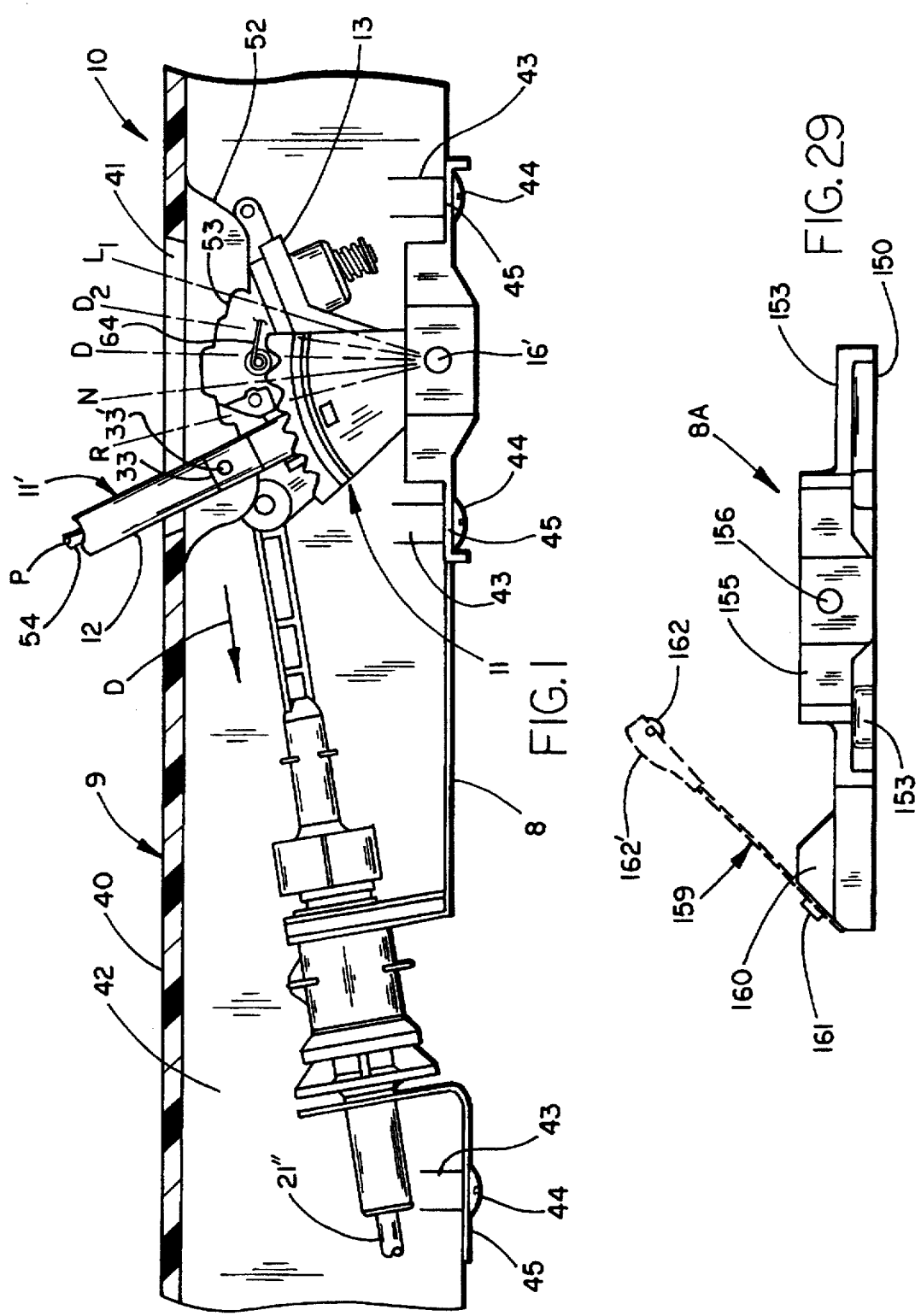

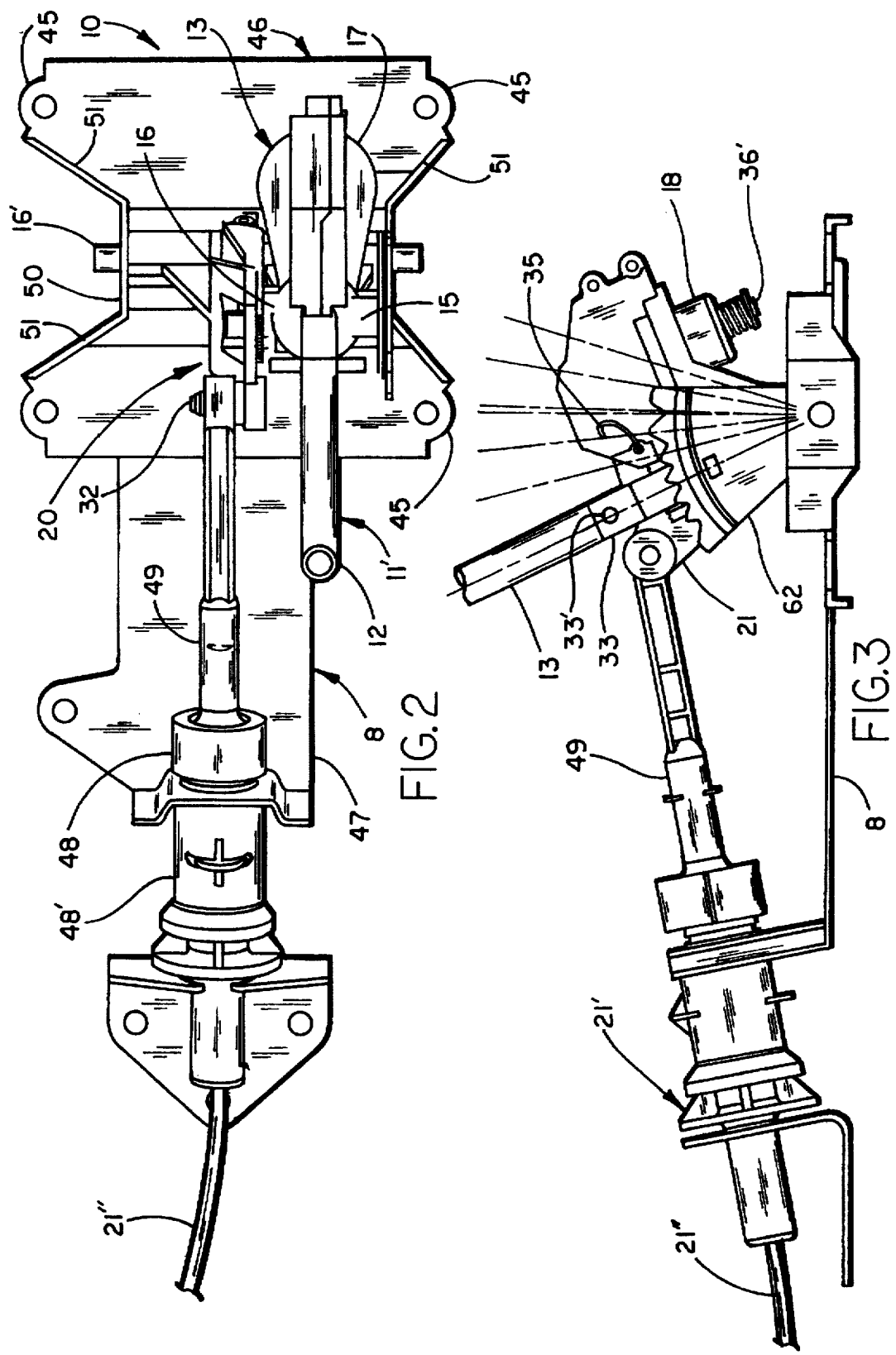

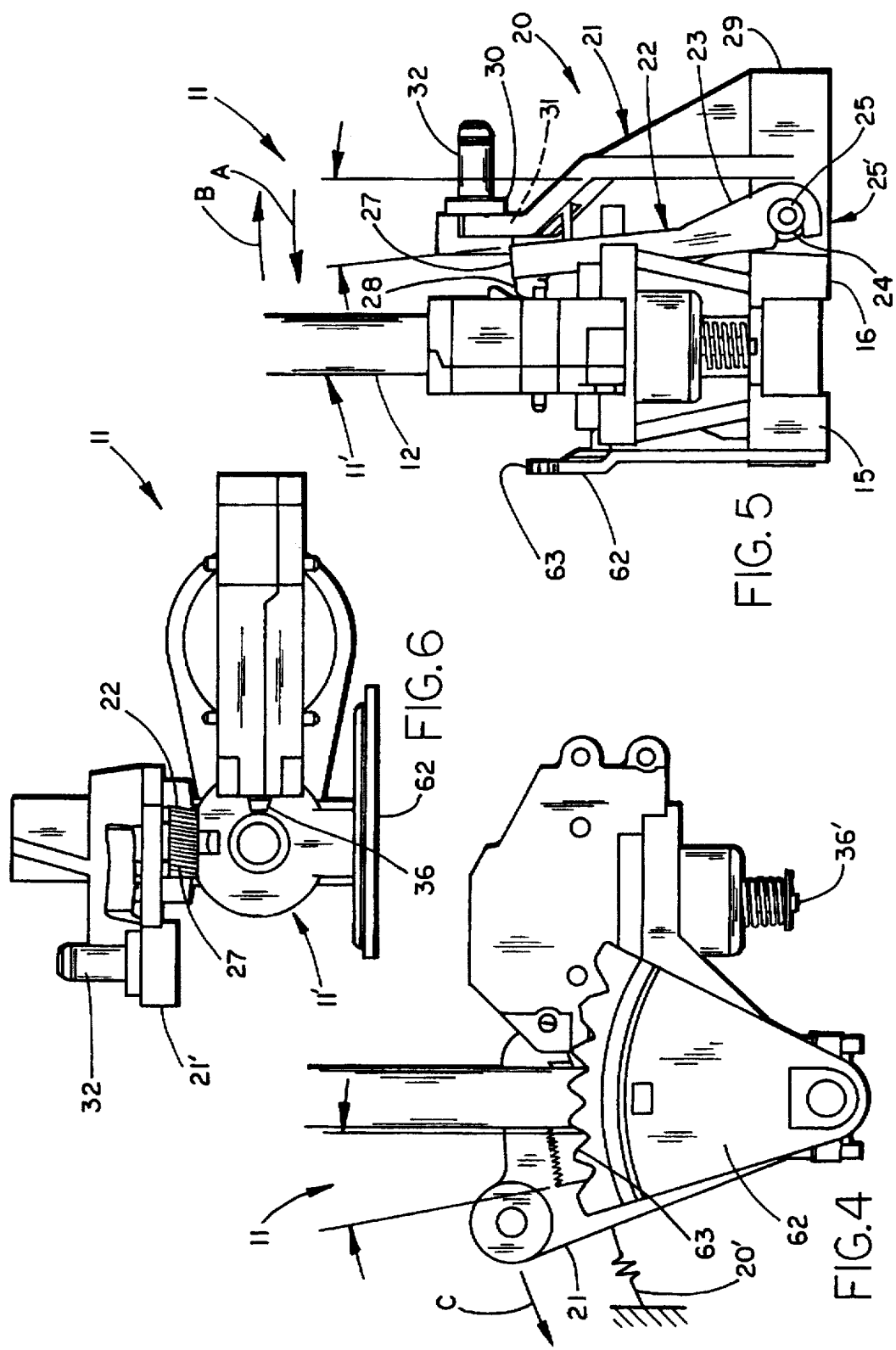

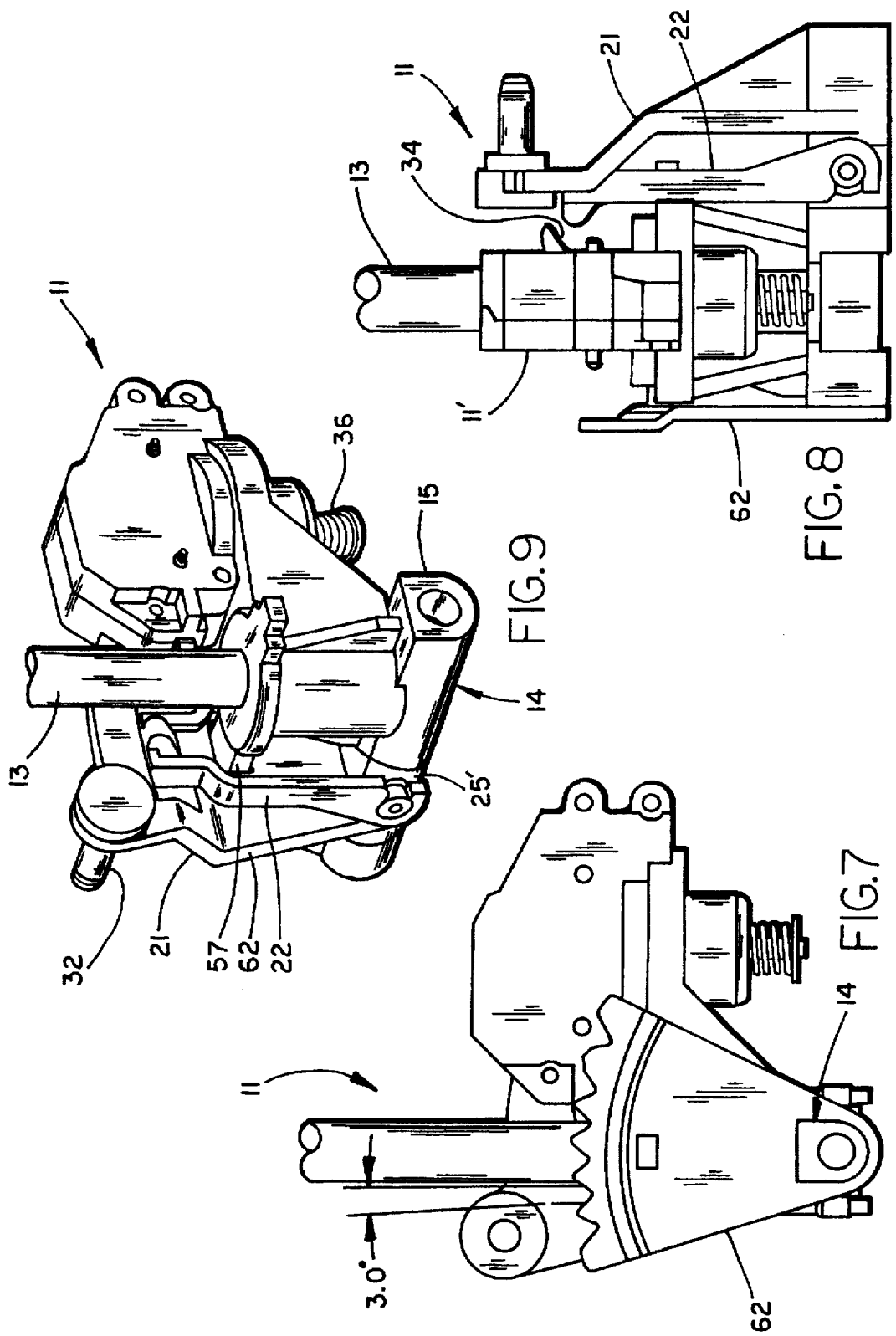

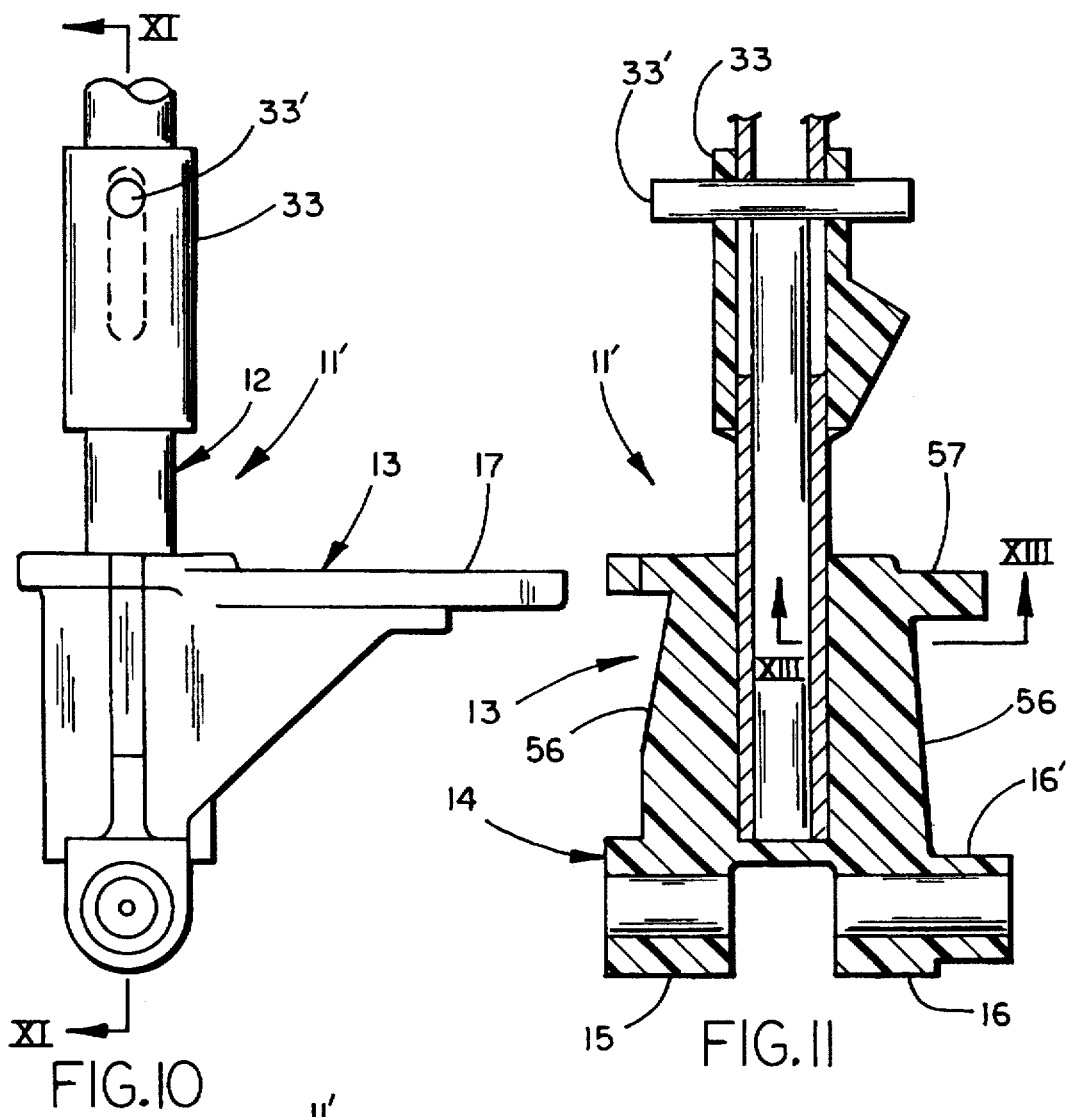
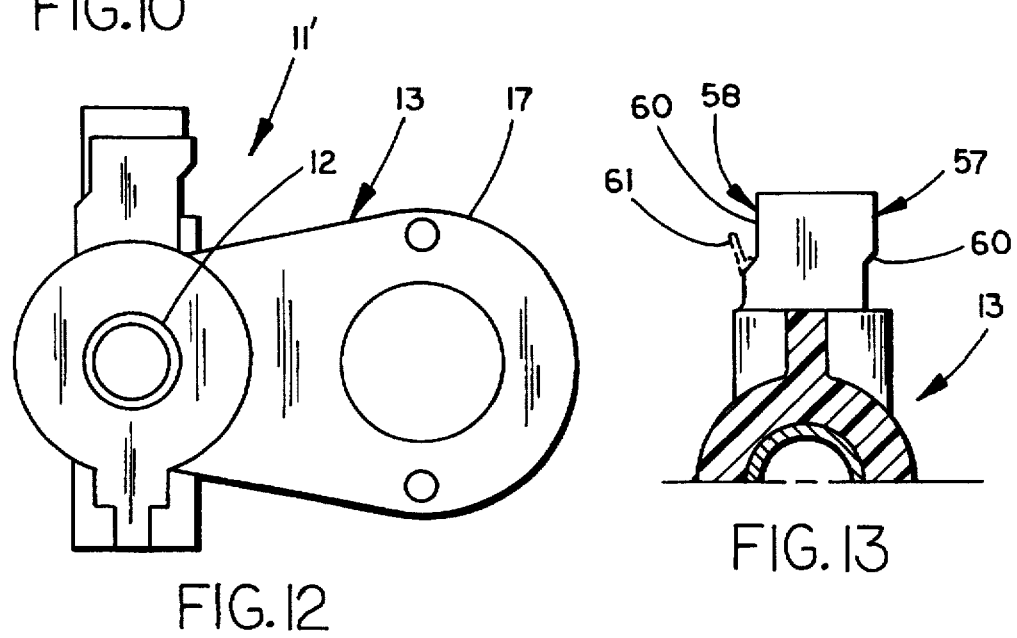

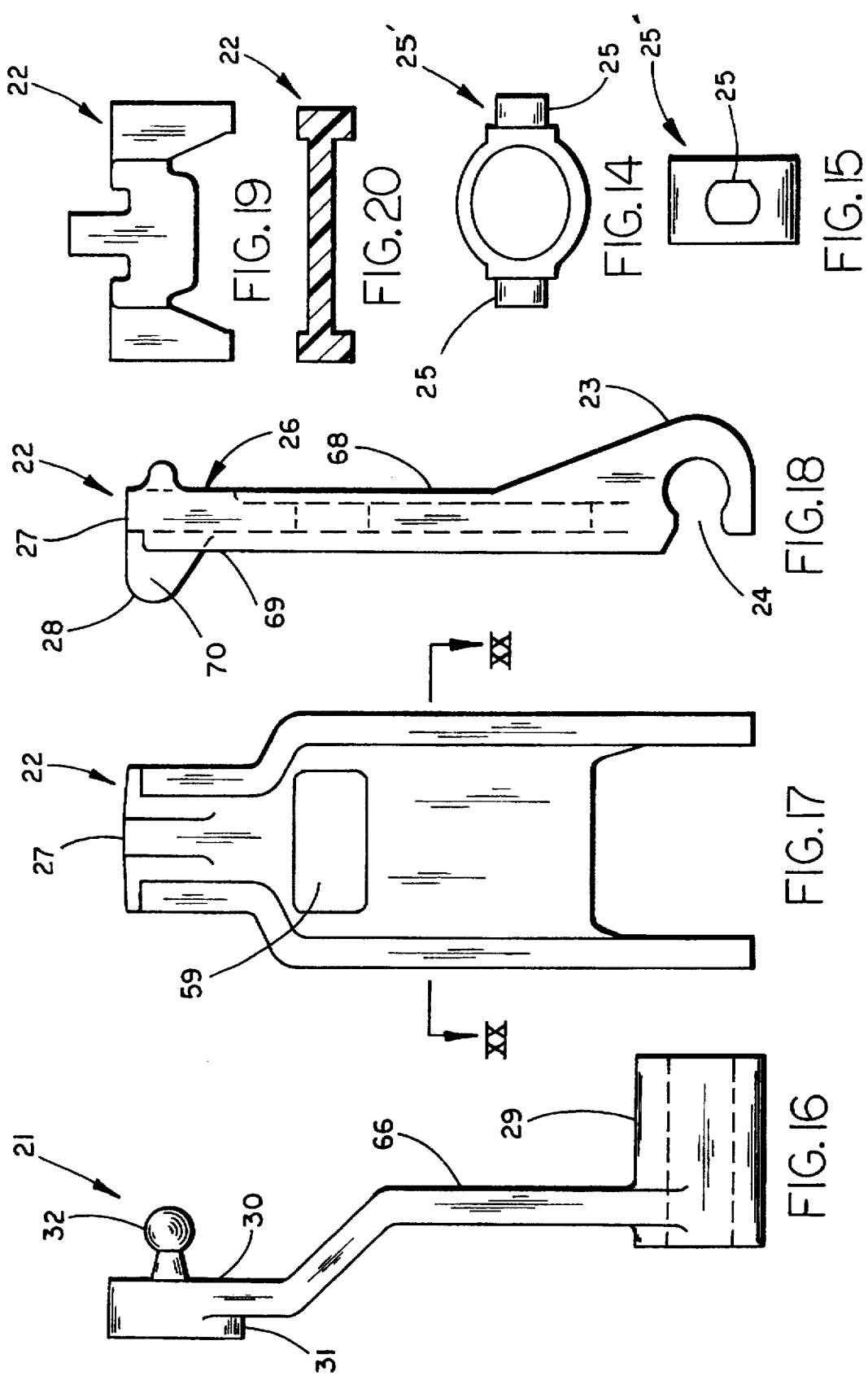

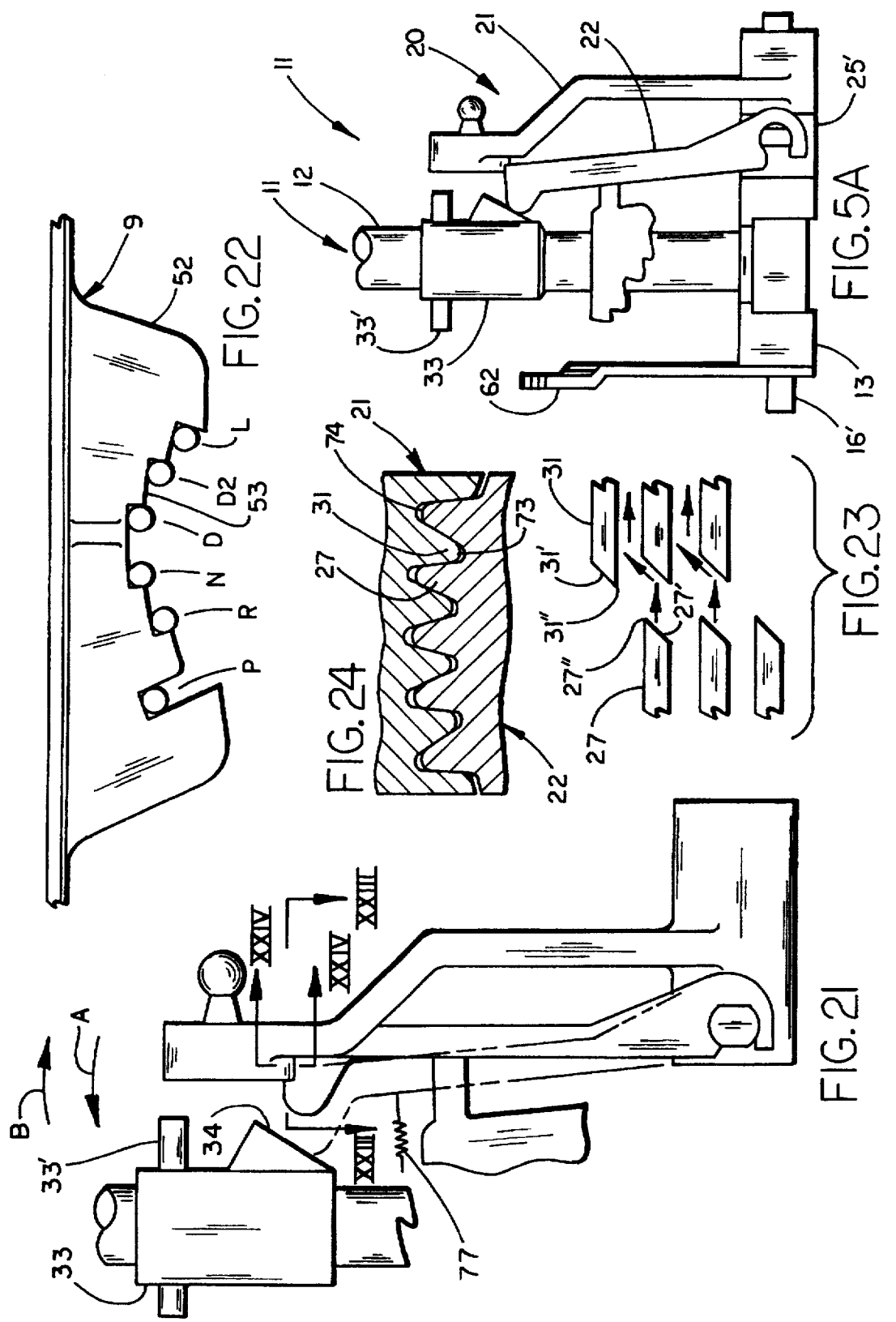

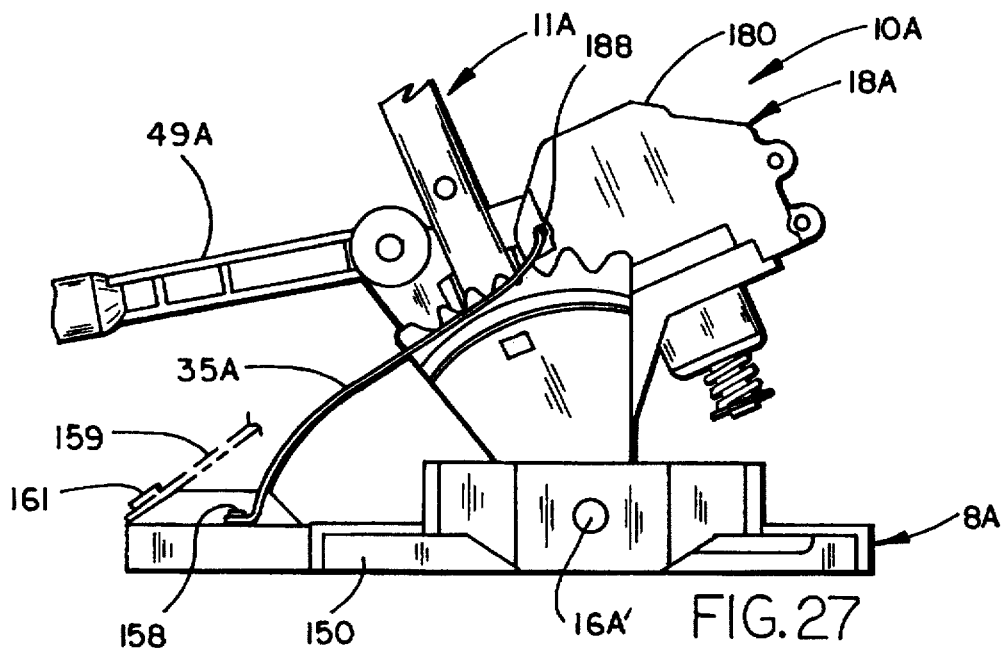
FIG. 27
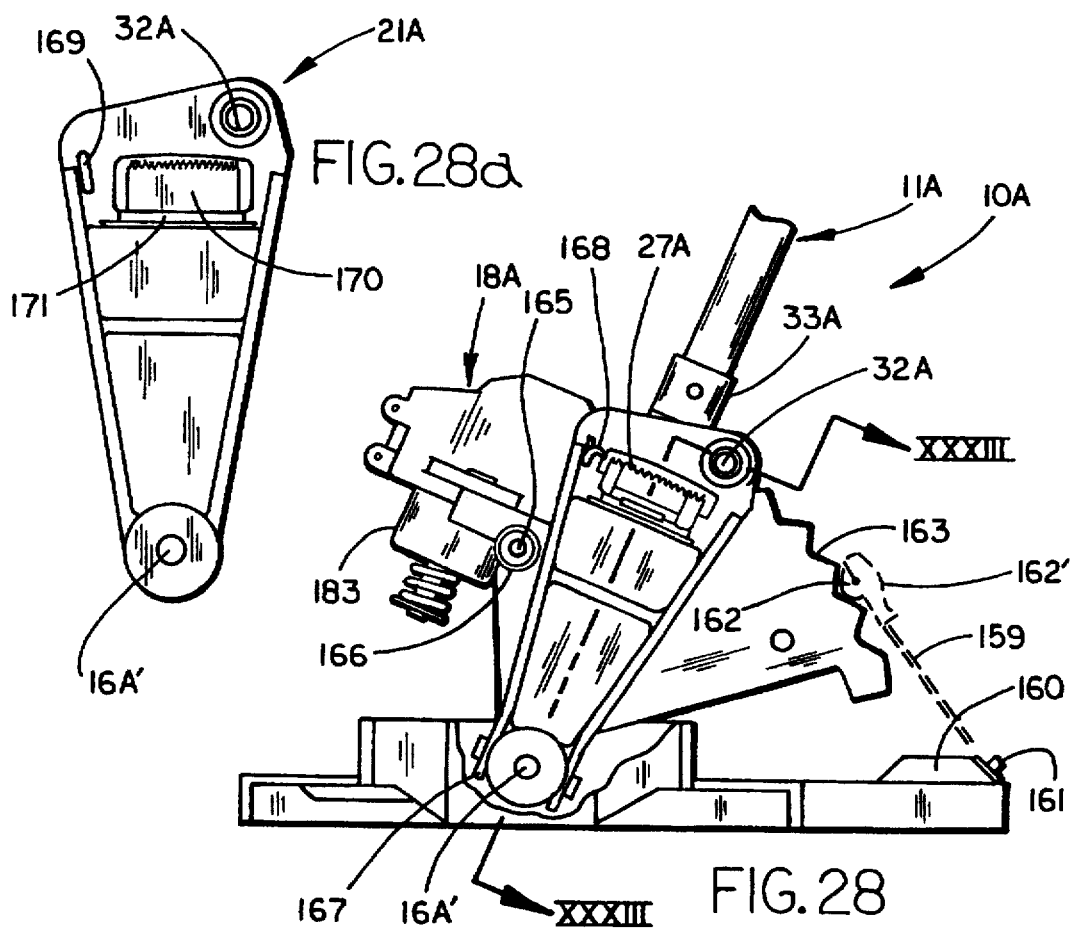
FIG. 28a
FIG. 28

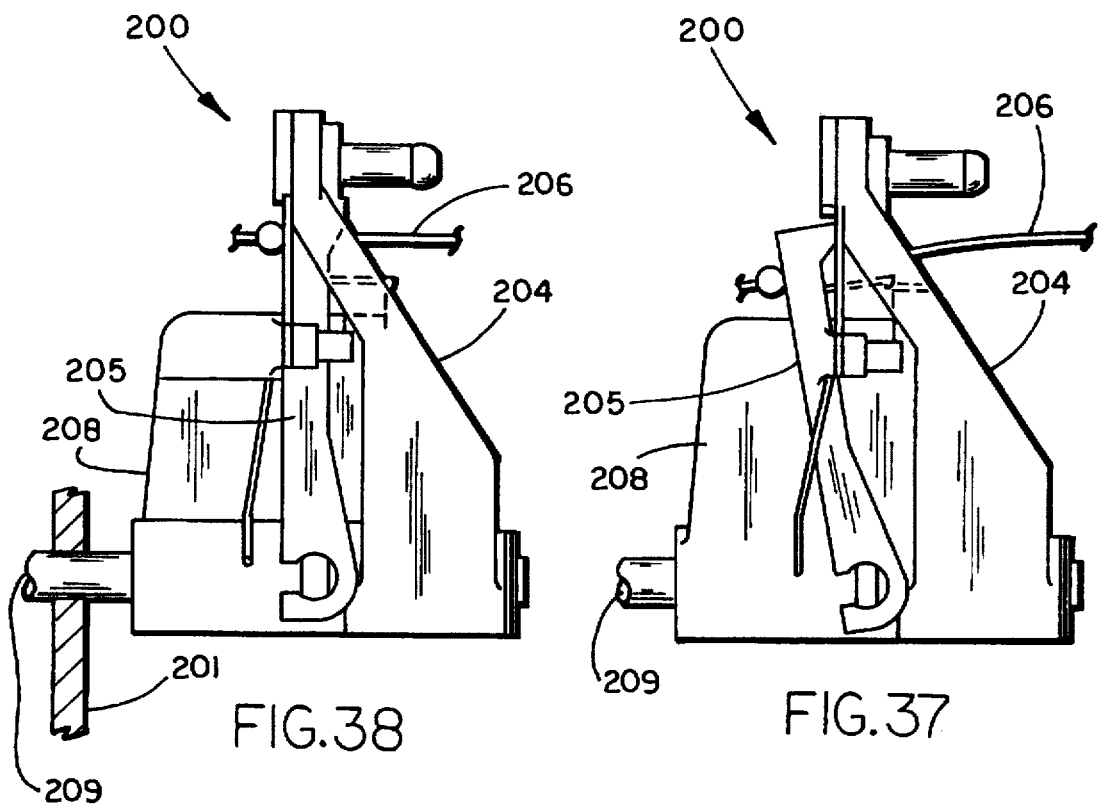
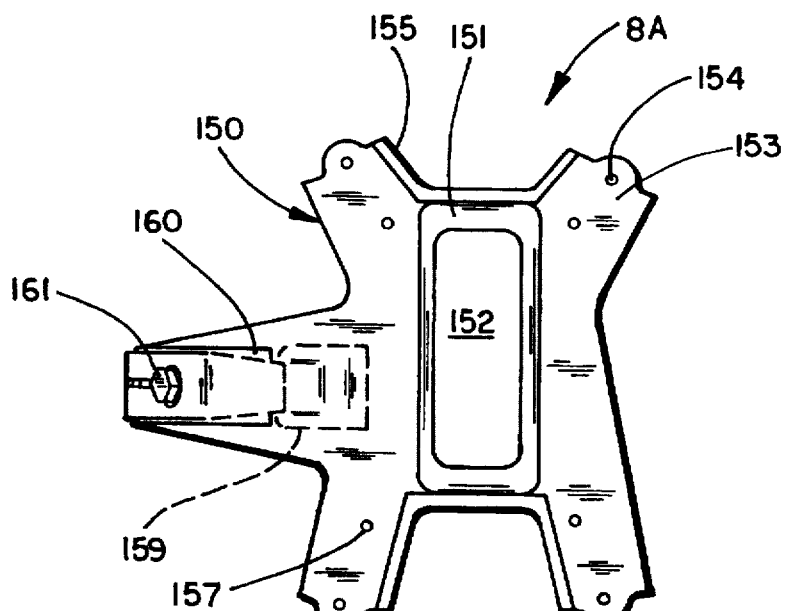

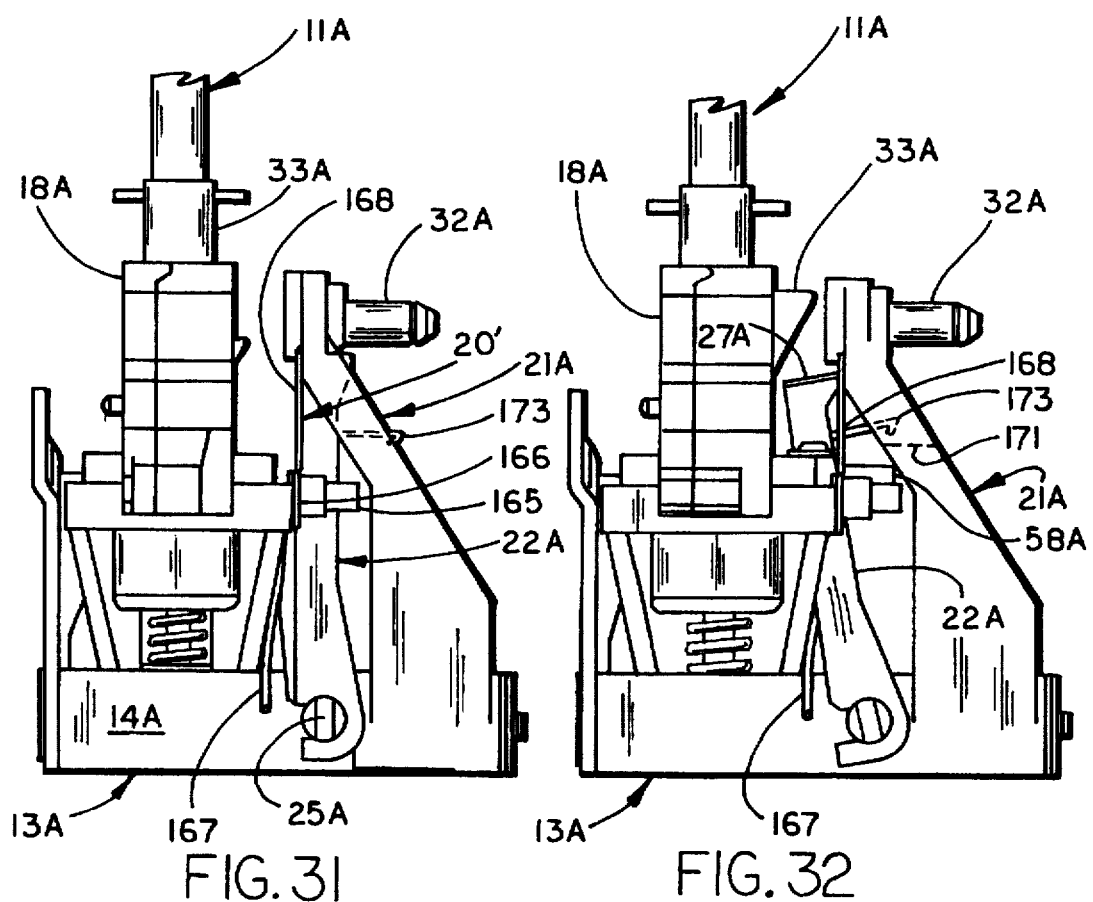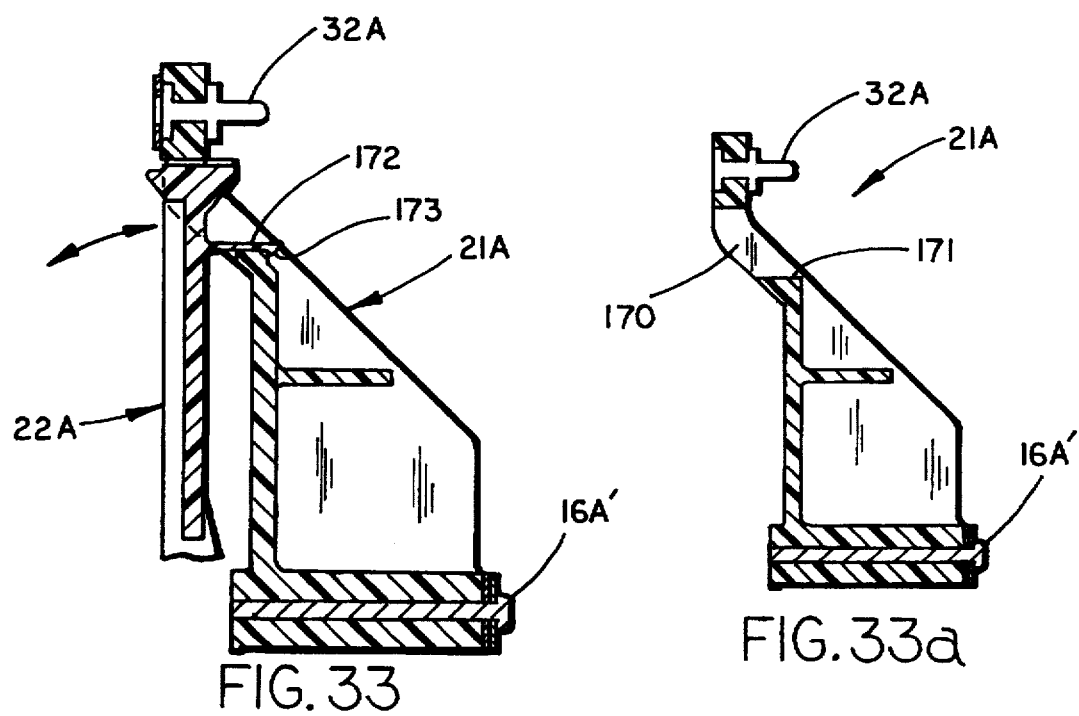

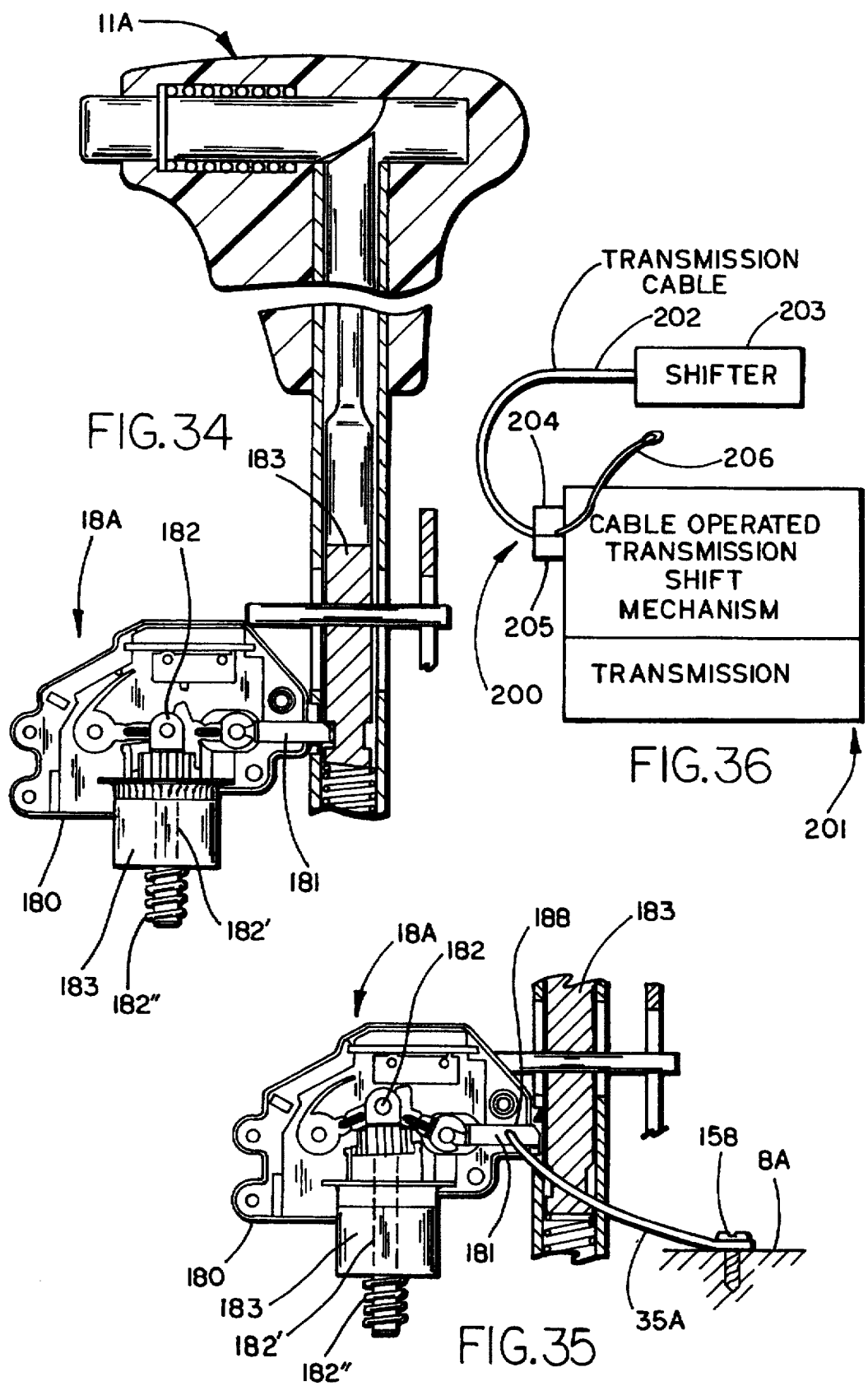

SHIFTER WITH CABLE ADJUSTABLE MECHANISM

The present application claims priority under 35 USC §119(e) of a commonly assigned, copending provisional application Ser. No. 60/012,874, filed Mar. 5, 1996, entitled SHIFTER WITH CABLE ADJUSTMENT MECHANISM.

BACKGROUND OF THE INVENTION

The present invention is related to vehicle shifters for cable operated transmissions, and more particularly is related to a vehicle shifter having an adjustment mechanism thereon for accommodating variations in cable length and related variations due to assembly. The present invention further relates to an adjustment mechanism for setting the effective operating length of a vehicle shift system including a shift lever, a cable, and a transmission.

Many modern vehicles include an automatic transmission and a shifter operably connected to the transmission by a telescopeable transmission shift cable for controlling the transmission operation from the vehicle passenger compartment. The shifter allows the operator to shift between operating positions, such as between "park," "reverse," "neutral," and "drive" gear positions. It is important that the operating length of the transmission shift cable be properly adjusted so that the vehicle transmission will shift to a desired operating position when the shifter is moved. Misadjustment of even a few millimeters can cause significant improper positioning of the shifter relative to the operating positions of the transmission, resulting in customer dissatisfaction and warranty expense. On the other hand, it is not possible to design the cable-operated transmission shift system with a net build design using present commercially available cable assemblies and shifters because of unavoidable variations in the length of transmission cables during their manufacture, because of vehicle component tolerance variances, and because of build, stack-up variations that occur during assembly of a vehicle.

One way of adjusting a shift system is to set the effective cable length during assembly. However, present assembly methods often use clip, screws, and fasteners that require manual attachment, thus making them labor-intensive and time consuming. Further, many of the present connection and adjustment constructions are subject to the accuracy of the person making the adjustment. Some transmission shift cables include a sleeve with a snap-in clip that provides a length adjustment feature, which allows the person making the adjustment to lock in a sleeve's effective length to provide a correct effective cable length after the transmission shift cable assembly is connected to the shifter and the transmission. However, the step of locking in the correct length is a separate assembly step made after the vehicle is substantially assembled, such that the clip may be difficult to access. Even if the clip is set early in the assembly process, the step takes up valuable assembly time and labor, which is at a premium during assembly of the vehicle. Also, the step of locking is subject to error, such as occurs if the clip on the length adjustment feature is not fully seated, or if the shift cable length is not properly connected at both ends when the adjustment feature is locked.

U.S. Pat. No. 5,207,124 discloses a shifter having a fastener that can be tightened to clampingly retain the assembly in a cable-adjusted position. Also, it is known to provide a cable assembly with a cable-adjust feature, such as a slip-fit toothed clip which engages mating parts of the cable assembly itself to set its effective operating length. However, both of these arrangements require a separate manual step of tightening/locking that is dependent upon the person making the connection and that takes up assembly time. Further, both of these arrangements may allow misadjustment and unacceptable variation to occur.

Thus, a shifter is desired solving the aforementioned problems.

SUMMARY OF THE INVENTION

In one aspect, the present invention includes a shifter assembly for a shifting a vehicle transmission via a transmission shift cable. The shifter assembly includes a shift lever, a support pivotally supporting the shift lever, a cable-actuating arm pivotally attached to the shift lever and adapted for operative connection to the transmission shift cable, and a coupler for securing the cable-actuating arm to the shift lever in an adjusted position. The coupler is movable between an installed position where the cable-actuating arm can be adjusted and an interlocked position where the cable-actuating arm is secured to the shift lever. One of the support and shift lever includes an actuator constructed to engage the coupler to move the coupler from the installed position to the interlocked position when cable-actuating arm is at a desired position with respect to the shift lever. In one form, the actuator is actuated by movement of a pawl on the shift lever.

In another aspect, a shift lever subassembly for a shifting a vehicle transmission via a transmission shift cable includes a shift lever having a pawl movable between a locked position where the shift lever cannot be moved, and a released position where the shift lever can be moved. A cable-actuating arm is pivotally attached to the shift lever and adapted for operative connection to the transmission shift cable. An interlocking mechanism is provided for securing the cable-actuating arm to the shift lever as the pawl is moved from the locked position to the released position.

In yet another aspect, a shift lever assembly is provided having a shift lever pivotally supported for movement between a park position and various gear positions. The shift lever includes a pawl. An interlock device is provided for holding the shift lever in the park position until predetermined vehicle conditions are met. The interlock device includes a pin movable between a pawl-restrained first position and a pawl-released second position. A restraining member releasably engages the pin for holding the pin in the pawl-released position until the restraining member is operated to release the pin, whereafter the interlock device is operable.

In another aspect, a method includes steps of providing a shift lever having a pawl and an automatic adjustment mechanism, and providing a telescopeable cable attached to the adjustment mechanism on the shift lever. The method further includes setting a cable operating length in the shift lever by moving the pawl from one position to another position, thus causing the adjustment mechanism to secure the telescopeable cable in an adjusted position relative to the shift lever.

In another aspect, a shift lever subassembly for shifting a vehicle transmission via a transmission shift cable includes a shift lever having a pawl movable between a locked position where the shift lever cannot be moved, and a released position where the shift lever can be moved. The shift lever includes a cable-actuating arm having a connector adapted for connection to the transmission shift cable. A park lock device is attached to the shift lever and is constructed to engage the pawl to hold the pawl in the locked position and to prevent movement of the pawl to the released position until predetermined vehicle conditions are met.

In another aspect, a shifter assembly for shifting a vehicle transmission via a transmission shift cable includes a shift lever constructed for pivotal mounting to a support, a cable-actuating arm movably attached to the shift lever and adapted for operative connection to the transmission shift cable, and a coupler for securing the cable-actuating arm to the shift lever in an adjusted position. The coupler is movable between an adjustment-permitting position where the transmission shift cable can be accommodated, and an interlocked position where the cable-actuating arm is secured to the shift lever. The cable-actuating arm and the coupler have mating teeth that are constructed to engage and hold the transmission shift cable in a desired position relative to the shift lever as the coupler is moved to the interlocked position.

In another aspect, an apparatus includes a transmission shift lever constructed for operative attachment to a vehicle, a transmission shift control mechanism constructed for attachment to a vehicle transmission, and an elongated member operably connecting the transmission shift lever to the transmission shift control mechanism. The elongated member has a predetermined length. An adjuster is provided on one of the transmission shift lever, the transmission shift control mechanism, and the elongated member. The adjuster includes a coupler for securing the elongated member to one of the transmission shift lever and the transmission shift control mechanism in a secured/non-adjustable position, and further includes an actuator for causing the coupler to move from an adjustment-permitting position to the secured/non-adjustable position. This structure allows the apparatus to be set in a properly adjusted position by operation of the actuator after attachment of the elongated member to the transmission shift lever and after attachment of the elongated member to the transmission shift control mechanism.

In another aspect, a shifting system includes a shift lever, a transmission control device for attachment to a vehicle transmission, an elongated member operably connecting the shift lever and the transmission controlling device, and an adjuster on one of the shift lever, the transmission control device, and the elongated member. The adjuster is constructed to set an operating length of the elongated member after attachment of the shift lever to one end of the elongated member and after attachment of the transmission control device to another end of the elongated member. The adjuster includes an actuator for moving the adjuster from an adjustment-permitting position to an interlocked/non-adjustable position from a location remote from the adjuster.

In another aspect, a method includes providing a shift lever, a transmission control device, and an elongated member operably connected to the shift lever and the transmission control device. The method further includes providing an adjuster on one of the shift lever, the transmission control device, and the elongated member, and actuating the adjuster from a location remote from the adjuster to set the operating length of the elongated member after attaching the shift lever to one end of the elongated member and after attaching the transmission control device to another end of the elongated member.

These and other features and advantages of the present invention will be further understood and appreciated by those skilled in the art by reference to the following specification, claims and appended drawings.

DESCRIPTION OF DRAWINGS

FIG. 1 is a side cross sectional view of a shifter and console assembly embodying the present invention;

FIG. 2 is a plan view of the shifter assembly shown in FIG. 1;

FIG. 3 is a side view of the shifter assembly shown in FIG. 2;

FIGS. 4, 5, 5A, and 6 are side, rear, fragmentary rear, and top views of the shift lever subassembly shown in FIG. 2, the adjuster mechanism being in the adjustment-permitting position as it is installed in a vehicle;

FIGS. 7–9 are side, rear, and perspective view of the shift lever subassembly shown in FIG. 2, the adjuster mechanism being in the interlocked/adjusted position;

FIGS. 10–12 are side, rear and top views of the shift lever including the pivot-forming base and the pawl, FIG. 11 being shown as a cross section along the line XI—XI in FIG. 10;

FIG. 13 is a cross sectional view taken along the line XIII—XIII in FIG. 11;

FIGS. 14 and 15 are top and side views of the coupling-support ring shown in FIG. 5;

FIG. 16 is a rear view of the actuating arm shown in FIG. 5;

FIGS. 17–19 are side, rear and top views of the coupler shown in FIG. 5;

FIG. 20 is a cross sectional view of taken along the line XX—XX in FIG. 17;

FIG. 21 is a fragmentary rear view of the shift lever subassembly that shows the relationship of the coupler support ring, the actuating arm, the pawl and pawl-engaging body, and the coupler guide/driver on the shift lever;

FIG. 22 is a schematic side view representing the shift-indicating-detent notches on the detent-plate-simulating member on the underside of the console;

FIGS. 23 and 24 are schematic cross sectional views taken along the lines XXIII—XXIII and XXIV—XXIV in FIGS. 21 showing the intermeshing teeth on the coupler and the actuating arm, FIG. 23 showing a top of the teeth immediately before the teeth are brought into engagement and FIG. 24 showing a side view after the teeth are engaged;

FIGS. 27 and 28 are left and right side views, respectively, of yet another shifter incorporating the shift lever and adjuster of the present invention;

FIG. 28A is a side view of the cable-actuating arm shown in FIG. 28;

FIGS. 29 and 30 are side and top views of the base shown in FIGS. 27 and 28;

FIG. 31 is an end view of the shifter shown in FIGS. 27 and 28, the coupling lever being shown engaged with the cable-actuating arm;

FIG. 32 is an end view similar to FIG. 31 but with the coupling lever being shown disengaged from the cable-actuating arm;

FIG. 33 is a fragmentary cross-sectional view taken along the line XXXIII—XXXIII in FIG. 28;

FIG. 33A is a cross-sectional view of the cable-actuating arm shown in FIG. 33;

FIG. 34 is a side schematic view, partially broken away, showing the BITSI extendable pin for preventing movement of the shift lever pawl, the shift lever pin being in an extended position such that the pawl is held in the park position, and in turn the shift lever is held in park position;

5

Figure 25:
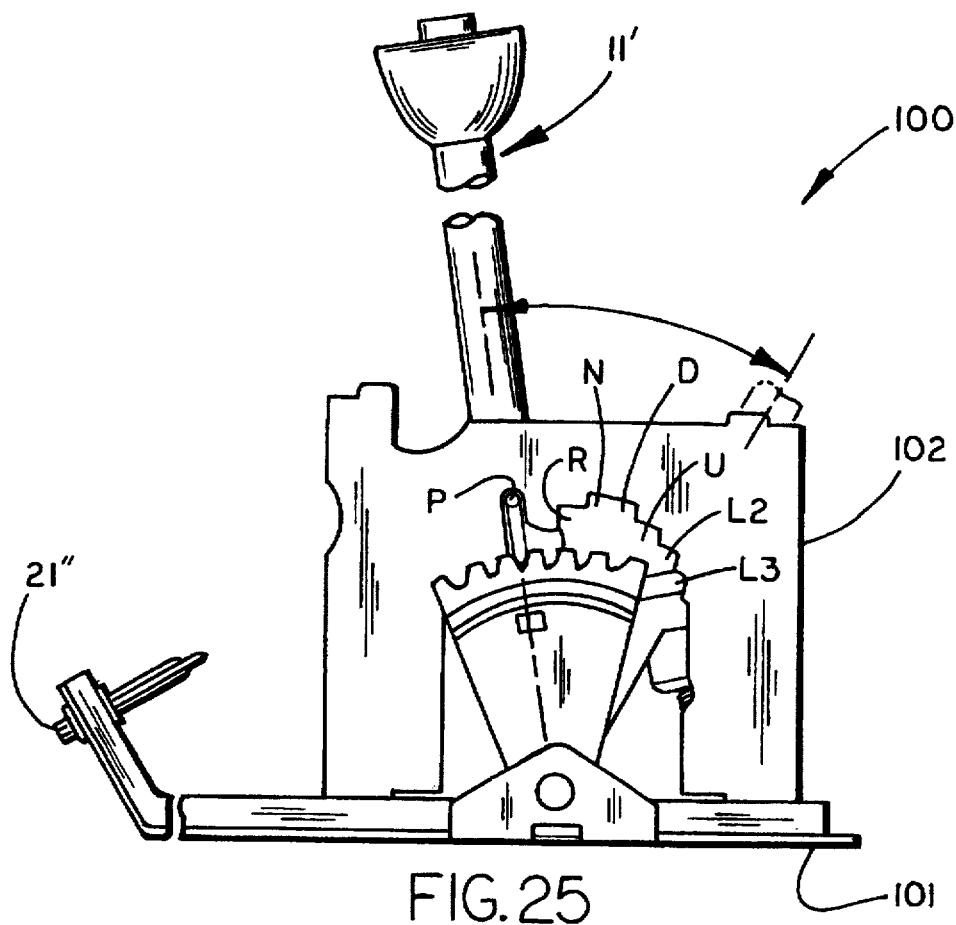
FIGS. 25 and 26 are side and top views of another shifter incorporating the shift lever and cable accommodating adjuster of the present invention.

FIG. 35 is similar to FIG. 34 but with the pin being held in a retracted position by a pinrestraining member comprising a pull wire;

FIG. 36 is a schematic view showing an adjustment mechanism separated from a shifter and positioned adjacent a transmission at an opposite end of a transmission cable; and FIGS. 37 and 38 are side views of a modified adjuster constructed for attachment to a transmission shift mechanism on a vehicle transmission. FIG. 37 showing the coupler in an adjustment-permitting position, and FIG. 38 showing the coupler in an interlocked/non-adjustable position.

DETAILED DESCRIPTION OF PREFERRED EMBODIMENTS

The present shifter 10 (FIG. 1) embodying the present invention includes a shift lever subassembly 11 mounted within a console 9 on a base 8. The shift lever subassembly 11 (FIG. 2) includes a shift lever 11' (FIGS. 10–13) having a tubular shaft 12 and a molded body 13 attached to a lower end of the shaft 12. The molded body 13 includes a pivot-forming section 14 (FIG. 11) with ends 15 and 16 for receiving a pivot pin 16' (FIG. 1), and an attachment structure 17 having a flange for receiving and mounting a brake-ignition-transmission-shifter interlock (BITSI) device or park lock electromagnetic device 18 thereto (FIG. 3). An automatic adjustment mechanism 20 (FIGS. 5 and 5A) is operably mounted to shift lever 11, and includes a cable-actuating arm 21 (FIGS. 16 and 21) and a coupling lever 22 (FIGS. 17–20). The particular cable-actuating arm 21 is configured to actuate a telescopeably extendable cable 21' (FIG. 3). The particulars of telescopeably extendable cable 21' and cable assembly 21" are disclosed in commonly assigned U.S. patent application Ser. No. 08/375,344, filed Jan. 19, 1995, entitled VEHICLE SHIFT CABLE CONNECTION, and further are described below as required to provide an understanding of the present invention. Coupling lever 22 (FIG. 18) includes a lower end 23 having a notch 24 therein for matingly rotatingly engaging opposing protrusions 25 (FIG. 14) on a coupler support ring 25'. Coupler support ring 25' is rotatably mounted on molded end 16 (FIG. 5), thus forming a double-rotatable pivot for coupling lever 22. The upper end 26 of coupling lever 22 (FIG. 18) includes a series of teeth 27 (see FIG. 6) and a camming surface 28 (FIG. 18).

Arm 21 (FIG. 16) includes a lower end 29 having a bore for mounting on the pivot pin that pivotally supports shift lever 11. The upper end 30 of arm 21 includes a series of teeth 31 positioned to engage teeth 27, and a universal cable connector 32. Coupling lever 22 is biased in a direction "A" by a spring (FIG. 21). A pawl 33' and pawl-connected slip ring or body 33 includes a ramp or inclined surface 34 configured to engage camming surface 28 (see FIG. 1) as pawl 33' is moved from a park-locked position (i.e. the pawl 33' is seated in the bottom of the park notch on the detent-plate-simulating surface of the console 9) to a park-released position (i.e. the pawl 33' is moved out of the park notch, but the shift lever 11' is not yet moved out of the park position).

When shifter 10 is installed, coupling lever 22 is in a released position (see FIGS. 4–6), such that the cable-actuating arm 21 is free to rotate relative to the shift lever 11'. Lever 21 is biased by a spring represented schematically at item 20' (FIG. 4) in a counterclockwise direction "C" relative to lever 11. It is contemplated that spring 21' can be mounted in a number of different ways on shifter 10, such as by a torsion wire spring proximate pivot pin 16'. This bias spring 20' provides the force required to make the connection of connecting rod 49 (as shown by arrow "D" in FIG. 1) to the inner core of cable 21. When the snap together cable connection is made. lever 21 is forced in a clockwise direction about 1 or 2 mm due to the fact that the inner core assembly of the cable assembly 21' bottomed out on the transmission cable attachment assembly. Now the angle faces 27' and 31' (FIG. 23) on the teeth 27 and 31 of levers 21 and 22 pull the cable 21", and the cam surface 60 of FIG. 13 additionally pulls the cable about 1–2 mm so that it is no longer bottomed out. Thus, it is free to travel the whole range that the shifter can provide.

Thus when a transmission shift cable is connected to universal connector 32, the cable-actuating arm 21 automatically self adjusts to a desired position from forces provided by the shift cable. Thereafter when an installer presses the shift lever button and causes the pawl 33' to move out of the park notch, the pawl 33' causes the coupling lever 22 to pivot in direction "B" (FIG. 21) to an engaged position (FIGS. 7–9) wherein the teeth 27 and 31 engage. This locks the cable-actuating arm 21 relative to the shift lever 11 ' so that they rotate as a unit. The coupling lever 22 is fully interlocked to the cable-actuating arm 21 before the pawl 33' moves to a position out of the park notch so that there is no way to move the shift lever 11 from park without the coupling lever 22 fixing the coupling arm 21 to the shift lever 11' and in particular to the molded body 13 thereof. A catch (not shown) secures the teeth 27 and 31 in an interlocked position so that coupling lever 22 cannot disengage. Notably, the teeth 27 and 31 are angled so that the coupling lever 22 rotates cable-actuating arm 21 slightly rearwardly relative to the shift lever 11' to adjust an operating length of the transmission shift cable a millimeter or so as the coupling lever 22 rotates into the interlocked engagement with cable-actuating arm 21.

A stiff pull string/wire/cord 35 of polymeric or metal (FIG. 3) can be extended through the molded body 13 so that it engages the electromagnetically actuated link or bell crank (not specifically shown) to hold it in a retracted position. This allows the extendable pin 36 (FIG. 6) of the BITSI (brake ignition transmission shift interlock) device 18 to be held in a retracted position until the shifter 10 has been adjusted for transmission cable length. Thus, when it is desired to make the BITSI system operable, the pull string 35 is pulled out allowing the BITSI extendable pin 36 to extend into interlocking engagement with the pawl 33'. This allows pin 36 to prevent accidental movement of the pawl 33' out of the park position. When the BITSI device 18 is operable, shift lever 11' cannot be moved until the BITSI device 18 is electrified, which occurs when the brake is pushed. A manual release 36' (FIG. 4) is provided to permit manual release of the interlock device 18, such as by a repairman in the field. An exemplary BITSI device 18 is disclosed in commonly assigned U.S. application Ser. No. 08/713,141, filed Sep. 12, 1996, entitled VEHICLE PARK/ LOCK MECHANISM WITH CONTROL MODULE HAVING A LOCKING MECHANISM AND A CONTROL SWITCH ACTUATED BY THE LOCKING MECHANISM, the entire contents of which are incorporated herein in its entirety by reference.

Console 9 (FIG. 1) includes a top wall 40 with an aperture 41 therein for receiving the shift lever shaft 12, and side walls 42 extending downwardly from top wall 40. Bosses 43 and other attachment structure are located on sidewalls 42 as required for attachment of base 8 by screws 44. Screws 44 extend through aperture flanges 45 in base 8 (FIG. 2) into bosses 43. Notably, it is contemplated that base 8 can be incorporated into the structure of console 9, such that the need for a separate base part is eliminated. Base 8 (FIG. 2) includes a main portion 46 for supporting shift lever subassembly 11, and an extended portion 47 for supporting a cable sheath or the like 48. Cable sheath 48 supports a remote end of a connecting rod 49 configured for engagement with universal cable connector 32. Base 8 includes opposing flanges 50 that are spaced apart for mateably receiving the pivot-forming section 14 of shift lever 11'. Flanges 50 include holes for pivotally receiving shift lever pivot pin 16'. Stiffening ribs 51 extend from opposing flanges 50 along the edges of base 8 toward apertures flanges 45 to stiffen base 8. Console 9 includes opposing slots in sidewalls 42 for accurately locating pivot pin 16 and for supporting same. A detent-forming section 52 (FIG. 22) including notches 53 defining gear positions park "P", reverse "R", neutral "N", drive "D", second gear drive "D2", and low "L" are formed in console 9 or are formed in a plate or other structural member attached to or integrated into console 9 or base 8.

The telescopeable cable assembly 21' includes the sheath 48 for connection to the extended base portion 47, and further includes the telescopeably extendable cable 21" for attachment to connecting rod 49. The details of the connection are not important to an understanding of the present invention, but it is noted that the details are shown in U.S. application Ser. No. 08/375,344, filed Jan. 1995, entitled VEHICLE SHIFT CABLE CONNECTION.

Shift lever 11' (FIG. 1) includes a straw 54 operably mounted within tubular shaft 12, the straw 54 being actuateable by operating a push button in a handle mounted on shaft 12. Straw 54 is connected to pawl 33' and is biased upwardly by a spring mounted therebelow within shaft 12. Pawl body 33 slides along the outside of shaft 12 along with pawl 33'. Pawl body 33 includes the ramp 34 (FIG. 8), which faces toward a side of shift lever 11' in a direction parallel the length of pivot pin 16'.

The molded body 13 (FIG. 11) on shift lever 11' includes ribs 56 that stiffen body 13 and hold ends 15 and 16 in a perpendicular position. The ribs 56 also support a laterally extending coupler guide/driver 57 that extends laterally from a main tube-supporting portion of molded body 13. Coupler guide/driver 57 includes an end section 58 that engages an aperture 59 in coupling lever 22. End section 58 includes shaped side surfaces 60 that control the rotation of coupling lever 22 as coupling lever 22 is rotated into interlocking engagement with cablea-ctuating arm 21. In particular, side surfaces 60 drive coupling lever 22 rearward about a millimeter after coupling lever 22 engages cable-actuating arm 21 but before coupling lever 22 is interlocked to cable-actuating arm 21, which accepts a predetermined length of telescopeable cable 21'. A resilient detent finger 61 can be used to hold the coupling lever 22 in an engaged position on cable-actuating arm 21.

A feel positioner plate 62 (FIG. 4) is attached to one side of shift lever 11'. Feel positioned plate 62 includes an upper surface having depressions 63 therein configured to receiving a spring biased feel positioner arm 64 (FIG. 1) operably mounted on the underside of the console 9.

The cable-actuating arm 21 (FIG. 16) includes the apertured pivot-pin-receiving lower end 29 configured to pivotally engage the pivot pin 16' adjacent the end 15 on shift lever molded body 13. An elongated center section 66 extends from lower end 29, and terminates in the off-set upper end 30 for supporting the cable connector 32.

The coupler support ring 25' (FIGS. 14 and 15) includes an inner diameter for rotatably engaging a reduced diameter portion 16' (FIG. 11) of the outer surface on end 16 of shift lever molded body 13. The pair of flat-sided, pivot-forming protrusions 25 extend outwardly from the body of ring 25' and form pivots for operably supporting coupling lever 22, as discussed below.

The coupling lever 22 (FIGS. 17–20) includes the lower end 23 that has open apertures 24 configured to slip-fit onto pivot-forming protrusions 25 on coupler supporting ring 25'. Notably, the protrusions 25 include flat sides permitting the coupling lever 22 to be slip-fit thereon when oriented generally horizontally. After being slip-fit onto protrusions 25, the coupling lever 22 can be rotated to an interlocked upright position on ring 25' where it cannot be removed from ring 25'. Coupling lever 22 further includes a center section 68 that is generally H-shaped in cross section, and includes the aperture 59 for receiving guide/driver 57. An upper end 69 includes a rounded protrusion 70 that extends toward the shaft 12 of shift lever 11', and that is operably engageable by ramp 34 along rounded camming surface 28 for driving coupling lever 22 into interlocked engagement with cable-actuating arm 21. The upper surface 27 of coupling lever 22 includes the teeth 27 that mateably engage downwardly facing teeth 31 on cable-actuating arm 21. The teeth 27 and 31 include angled leading surfaces 27' and 31' (FIG. 23) that define pointed edges 27" and 31". The pointed edges 27" and 31" prevent the leading edges of the teeth 27 and 31 from abutting in a manner that prevents the teeth from full engagement. The teeth 27 and 31 further include rounded top and bottom tips 73 and 74 (FIG. 24) so that the teeth 27 and 31 fully engage along the strongest face of each tooth, and so that the teeth do not unacceptably stress the teeth at their tips 73 and 74. It is contemplated that the teeth will be relatively shallow in depth so that they can be spaced relatively close together, thus providing the greatest number of discrete adjustment positions of coupling lever 22 on cable-actuating arm 21. Notably, it is also contemplated that the secure connection could be made in other ways, such as ways that would provide infinite adjustability, such as through use of rough grainy interfacing surfaces. In particular, it is noted that the coupling lever upper surface 71 moves arcuately and slightly upwardly as the coupling lever 22 moves from the disengaged position (FIG. 5) to the engaged and interlocked position (FIG. 8) due to the relative position of support ring protrusions 66" under the teeth 31 of cable-actuating arm 21. Notably, a spring 77 biases coupling lever 22 to the inwardly located disengaged position. Also, a locking finger 78 on guide/driver 57 holds the coupling lever 22 in the interlocked engaged position when the coupling lever teeth 31 are fully engaged in arm teeth 27, and when the coupling lever 22 reaches a fully seated and interlocked position on cable-actuating arm 21.

Figure 26:
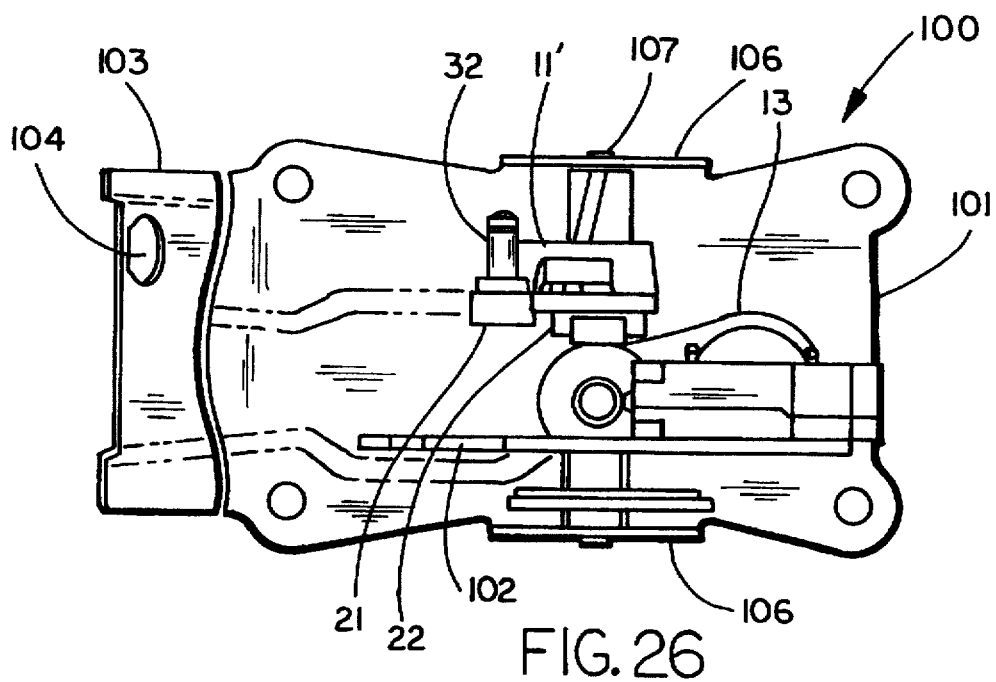

In another embodiment, a shifter 100 (FIGS. 25 and 26) includes a more conventional base 101 with a detent plate 102 thereon. The base 101 includes an end 103 having an aperture 104 for receiving a cable sheath of a conventional telescopeable cable assembly. The base 101 further includes apertures side flanges 106 for receiving a pivot pin 107. The shift lever subassembly 11 is operably mountable between side flanges 106 and under detent plate 102. The telescopeable cable of the cable assembly is connectable to the cable connector 32 on the shift lever 11'. The operation of the shift lever subassembly 11 on shifter 100 is generally self explanatory based on the above description, such that the description need not be repeated.

A modified shifter 10A (FIGS. 27–35) includes a shift lever subassembly 11A that is similar to shift lever subassembly 11. To reduce redundant discussion, the components and features of shifter 10A that are similar or identical to shifter 10 are identified using identical numbers, but with the addition of a letter "A."

Shifter 10A is mounted on a base 8A (FIGS. 29 and 30) that includes a body 150 defining a recess 151 and an opening 152. Attachment flanges 153 extend outwardly and include holes 154 for receiving screws to secure the base 8A to a console or to a vehicle floor pan. Strengthening ribs 155 extend around the opposing ends of recess 151. Ribs 155 include holes 156 for receiving a pivot pin for pivotally mounting shift lever subassembly 11A. A hole 157 is provided for receiving a screw 158 to secure an end of pull wire 35A (FIG. 27). A feel positioner 159 (FIG. 29) is mounted on a stand 160 on base 8A. The feel positioner 159 includes a leaf spring secured by a screw 161 to the stand 160. A roller 162 rotatably held at the free end of the leaf spring by a molded piece 162'. Roller 162 rollingly engages depressions 163 (FIG. 28) on shift lever subassembly 11A to provide a desired feel to a vehicle operator when shifting between gear positions.

Molded body 13A of shift lever subassembly 11A (FIG. 31) includes a pair of opposing, flat sided, integrally molded protrusions 25A for pivotally mounting coupling lever 22A. (It is noted that the ring 25' on shifter 10 is eliminated in the shifter 10A.) A protrusion 165 is formed on molded body 13A. A spring 20' includes a coil section 166 mounted on protrusion 165, a lower leg 167 pressing against pivot-forming section 14A, and an upper leg 168. Upper leg 168 extends into a slot 169 (FIG. 28a) in cable-actuating arm 21A, and biases the arm 21A toward the cable connecting rod 49A (FIG. 27).

A window 170 (FIGS. 28A and 33A) is formed in cable-actuating arm 21A, and a sharp lip 171 is formed along a bottom/exterior of the window. Coupling lever 22A (FIG. 33) includes a hooked finger 172 having an end 173 shaped to snappingly interlock in engagement with lip 171. The body of finger 172 is resilient to permit the snap attachment of finger 172 onto lip 171 as coupling lever 22A is cammed/rotated outward by downward movement of pawl body 33A.

The BITSI interlock device 18A (FIG. 34) is described in detail in commonly assigned U.S. patent application Ser. No. 08/713,141, filed Sep. 12, 1996, previously incorporated herein by reference. A detailed discussion of the BITSI device 18A is not required for an understanding of the present invention, and further it is noted that the present pull wire invention will work with different park lock systems. Briefly, device 18A includes a housing 180, an extendable pawl/straw-engaging pin 181, a toggle linkage 182 operably connected to pin 181, a movable core 182' connected to linkage 182, and an electromagnetic coil 183 for polarizing core 182' to bias the pin 181 to a normally extended position wherein the pawl/straw 183 is engaged and prevented from movement (FIG. 34). When coil 183 is energized, core 182' magnetically repels the linkage 182 to retract pin 181 so that pawl/straw 183 can be moved (e.g. to move the shift lever out of park position). The pull wire 35A extends through a hole 188 in housing 180 and through pin 181 such that it blocks pin 181 (or the linkage 182) in a retracted position (FIG. 35). Notably, it is contemplated that the pull wire arrangement can be used on many different BITSI devices in addition to the illustrated BITSI device 18A. During assembly of shifter lever subassembly 11A, pawl-engaging pin 181 is retracted and pull wire 35A is extended through the holes 188 to hold the pin 181 in the retracted position against the bias of spring 183. Thus, the BITSI device is temporarily made inoperable. This allows assembly of the vehicle to proceed without interference from the BITSI system.

The other end of pull wire 35A is secured by screw 158 to base 8A (FIG. 27). The length of the pull wire 35A is such that when shift lever subassembly is pivoted out of park position "P," the pull wire 35A is automatically pulled out of holes 188, thus making the BITSI device 18A operable. It is noted that a repairman could also use this to aid in repair of vehicles in the field.

It is contemplated that the pull wire concept could be used on numerous different shifters and park interlock devices, and its operation is not intended to be limited only to the illustrated embodiment. For example, the pull wire could be extended through aligned holes in a housing and extendable pin, or through aligned holes in a bell crank and adjacent structure. The "tail" of the pull wire could also be connected to something other than an attachment screw, such as a specially adapted component or piece, or could be extended through a side wall of a console where an assembly person could pull it at an appropriate time to make the BITSI device operable. It is also contemplated that the concept of a restraining member is not limited to only a pull wire, but could also include latches and other release arrangements and mechanisms.

It is also contemplated that the pawl-actuated automotive adjustment mechanism could be mounted on the transmission instead of at the shifter. For example, in FIG. 36, an adjustment and shifter-control mechanism 200 is mounted on a transmission 201, and a telescopeable transmission cable or elongated rod 202 is extended from the shifter 203 to the mechanism 200. In this arrangement, the mechanism 200 (FIGS. 37 and 38) includes a cable-connected arm 204 and a coupling device 205 for locking the cable-connected arm in an interlocked/non-adjustable position. A base or support 208 is configured for attachment to the transmission housing adjacent rotatable transmission control shaft 209. Arm 204 is secured to shaft 209, and operably rotates shaft 209 as cable 202 is operated by shifter 203. It is noted that components 208, 205, and 204 are not unlike components 13 (FIG. 11), 27 (FIG. 17), and 21 (FIG. 5A). The coupling arm could be actuated by several different means, such as by use of a second pull wire 206 or other remote actuator device. In particular, when the pull wire 206 is pulled, the coupling device is drawn from an adjustment-permitting position (FIG. 37) into a secured/non-adjustable position. Other actuating mechanisms could also be used, such as a camming arrangement. (See ramp 34 on pawl body 33.) It is specifically contemplated that a remote actuator or pull wire could be operably connected to an adjuster incorporated in any one of the shifter, the cable, or the transmission control mechanism. This would have the highly desired feature of providing an adjuster that was actuateable from a remote position to set the operating length of the cable in a system comprising a shift lever, an elongated cable, and a transmission shift control mechanism.

An important feature of the present shift lever subassemblies 11 and 11A is their self-contained unitized nature, wherein critical components are assembled to the shift lever itself. This contrasts to the mentality in prior art where critical components, especially electrical components, were typically mounted to an assembly of a base and a shift lever pivoted to the base. Specifically, the present shift lever assemblies include components attached to the shift lever in a manner allowing the shift lever assembly to be assembled to a separate component, such as to pivot structure on a console or a bracket on the floor pan of a vehicle. This is entirely different than an assembly including a base and a pivotally mounted shift lever. One reason is because, if the shift lever manufacturer does not attach the shift lever to a base, but instead allows the vehicle manufacturer or console manufacturer to pivotally support the shift lever, the task of controlling of the pivotal connection and related tolerances are suddenly very different and very difficult. Typically, shifters are subject to close control of tolerances due to their sensitivity and close connection to customary dissatisfaction. Customers are not only very sensitive to appearance, but they are sensitive to the "feel" of the shifter as well. Any sloppiness or noise tends to be unacceptable and objected to, resulting in warranty expense. In shifter 11 and 11A, the park lock mechanism including the solenoid and also the feel positioner with undulated surface are part of the shift lever. The shift levers 11 and 11A are further constructed to permit quick attachment, but with an adjustment mechanism adapted to accommodate cable length manufacturing variations, stack-up tolerance, and assembly variations.

It is noted that the arm 204 and coupler 205 (FIGS. 37 and 38) are substantially similar to the arm 21 (and 21A) and coupler 22 (and 22A) on the shifter 11 (and 11A). It is contemplated that a pull wire like 206 could be used on the shifter 11 (and 11A) to move coupler 22 (or 22A) to an engaged position from a remote location, instead of the pawl actuated system shown in shifters 11 and 11A. It is also contemplated that a camming arrangement similar to that of pawl body 33 and 33A (see ramp 34) could be used on the device 200 at the transmission 201. It is further contemplated that any one of the pull wire, the camming arrangement, or a pawl actuated construction could be integrated into a coupler located at an intermediate portion of the cable 202.

Thus, a shifter assembly for a shifting a vehicle transmission via a telescopeable transmission shift cable is provided. The shifter assembly includes a base, a shift lever pivoted to the base, a cable-actuating arm pivotally attached to the shift lever and adapted for operative connection to the transmission shift cable, and a coupler for securing the cable-actuating arm to the shift lever in an adjusted position. The coupler is movable between an installed position where length in the transmission cable can be accommodated and an interlocked position where the cable-actuating arm is secured to the shift lever. An actuator on one of the base and the shift lever is adapted to engage the coupler to move the coupler from the installed position to the interlocked position when the transmission cable is at a desired position giving it an effective operating length that is acceptable. In another form, the auto-cable-adjust feature is incorporated into structure on the transmission itself.

In the foregoing description, it will be readily appreciated by those skilled in the art that modifications may be made to the invention without departing from the concepts disclosed herein. Such modifications are to be considered as covered by the following claims, unless these claims by their language expressly state otherwise.

The embodiments of the invention in which an exclusive property or privilege is claimed are defined as follows:

1. A shifter assembly for shifting a vehicle transmission via a transmission shift cable, comprising:
   a shift lever;
   a support pivotally supporting the shift lever;
   a cable-actuating arm movably attached to the shift lever and adapted for operative connection to the transmission shift cable;
   a coupler for securing the cable-actuating arm to the shift lever in an adjusted position, the coupler being movable between an adjustment-permitting position where the cable-actuating arm can be adjusted, and an interlocked position where the cable-actuating arm is secured to the shift lever; and
   an actuator on one of the support and the shift lever for engaging the coupler to move the coupler from the adjustment-permitting position to the interlocked position when the cable-actuating arm is at a desired position with respect to the shift lever.

2. The shifter assembly defined in claim 1 wherein the actuator is movably attached to the shift lever.

3. The shifter assembly deemed in claim 2 wherein the actuator includes a pawl and a pawl body slidably mounted on the shift lever, the pawl body including a ramp for rampingly engaging the coupler to move the coupler to the interlocked position as the pawl on the shift lever is moved.

4. The shifter assembly defined in claim 3 wherein the coupler and the cable-actuating arm include mating teeth that engage as the coupler is moved from the adjustment-permitting position to the interlocked position.

5. The shifter assembly defined in claim 4 wherein the mating teeth are angled to provide a predetermined amount of adjustment in cable position relative to the shift lever as the coupler is moved from the adjustment-permitting position to the interlocked position.

6. The shifter assembly defined in claim 1 wherein the shift lever includes a molded pivot member, and the coupler is pivoted to the pivot member.

7. The shifter assembly defined in claim 6 wherein the pivot member includes flat sided protrusions, and the coupler includes an end section shaped to slip attach to the flat sided protrusions.

8. The shifter assembly defined in claim 1 wherein the cable-actuating arm and the coupler include mating teeth that engage as the coupler is moved from the adjustment-permitting position to the interlocked position.

9. The shifter assembly defined in claim 1 including a brake-ignition-transmission-shift-interlock (BITSI) device operably attached to one of the support and the shift lever.

10. The shifter assembly defined in claim 9 wherein the BITSI device includes a release member for temporarily holding the BITSI device in an inoperative position until such time as the BITSI device is to made operable.

11. A shift lever subassembly for a shifting a vehicle transmission via a transmission shift cable, comprising:
   a shift lever including a pawl movable between a locked position where the shift lever cannot be moved and a released position where the shift lever can be moved;
   a cable-actuating arm movably attached to the shift lever and adapted for operative connection to the transmission shift cable; and
   an interlock mechanism constructed to secure the cable-actuating arm to the shift lever as the pawl is moved from the locked position to the released position.

12. The shift lever subassembly defined in claim 11 wherein the pawl includes a pawl body having a ramp and the interlock mechanism includes a camming surface that is engaged by the ramp as the pawl is moved to the released position.

13. The shift lever defined in claim 12 including a park lock device attached to the shift lever for holding the shift lever in a park position until predetermined vehicle conditions are met.

14. The shift lever subassembly defined in claim 13 wherein the park lock device includes a brake-ignition-transmission-shift-interlock (BITSI) device operably attached to the shift lever, the BITSI device including an extendable pin for movement between a blocking position for preventing movement of the pawl and a retracted position for allowing movement of the pawl.

15. The shift lever subassembly defined in claim 14 including a pull wire extending through the BITSI device for engaging the extendable pin to hold the extendable pin in the retracted position so that the BITSI device is inoperative, the pull wire being configured to release the extendable pin to make the BITSI device operable.

16. A shift lever assembly comprising:
   a shift lever pivotally supported for movement between a park position and various gear positions, the shift lever including a pawl;
   an interlock device for holding the shift lever in the park position until predetermined vehicle conditions are met, the interlock device including a pin movable between a pawl-restrained first position and a pawl-released second position; and
   a restraining member releasably engaging the pin for holding the pin in the second position and rendering the interlock device inoperable until the restraining member is moved to release the pin, whereafter the interlock device is operable.

17. The shift lever assembly defined in claim 16 wherein the restraining member comprises a pull wire.

18. The shift lever assembly defined in claim 17 wherein the pull wire is anchored at one end so that, upon moving the shift lever out of the park position toward the various gear positions, the pull wire is pulled free from the interlock device, rendering the interlock device operable.

19. The shift lever assembly defined in claim 18 wherein the interlock device includes a housing having a first hole, and the pin includes a stop surface located proximate the first hole when the pin is in the pawl-released second position, and wherein the pull wire extends through the first hole and abuttingly engages the stop surface to hold the pin in the pawl-released second position.

20. The shift lever assembly defined in claim 19 wherein the pin of the interlock device, when operable, selectively engages the pawl to hold the pawl in a notch corresponding to the park position, thus holding the shift lever in the park position.

21. A method comprising steps of:
   providing a shift lever having a pawl and an automatic adjustment mechanism;
   providing a telescopeable cable attached to the adjustment mechanism; and
   setting an effective operating length of the telescopeable cable relative to the shift lever by moving the pawl from one position to another position, thus causing the adjustment mechanism to secure the telescopeable cable in an adjusted position relative to the shift lever.

22. A shift lever subassembly for shifting a vehicle transmission via a transmission shift cable, comprising:
   a shift lever including a pawl movable between a locked position where the shift lever cannot be moved, and a released position where the shift lever can be moved, the shift lever including a cable-actuating arm having a connector adapted for connection to the transmission shift cable; and
   a park lock device attached to the shift lever and constructed to engage the pawl to hold the pawl in the locked position and to prevent movement of the pawl to the released position until predetermined vehicle conditions are met.

23. The shift lever subassembly defined in claim 22 wherein the park lock device includes an electromagnetic device mounted on the shift lever.

24. The shift lever subassembly defined in claim 23 wherein the park lock device includes an extendable pin operably associated with the electromagnetic device, the extendable pin being movable between a blocking position for preventing movement of the pawl and a retracted position for allowing movement of the pawl.

25. A shifter assembly for shifting a vehicle transmission via a transmission shift cable, comprising:
   a shift lever constructed for pivotal mounting to a support;
   a cable-actuating arm movably attached to the shift lever and adapted for operative connection to the transmission shift cable;
   a coupler for securing the cable-actuating arm to the shift lever in an adjusted position, the coupler being movable between an adjustment-permitting position where the transmission shift cable can be adjusted, and an interlocked position where the cable-actuating arm is secured to the shift lever; and
   the cable-actuating arm and the coupler having mating teeth that are constructed to engage and hold the transmission shift cable in a desired position relative to the shift lever as the coupler is moved to the interlocked position.

26. The shifter assembly defined in claim 25 wherein the mating teeth extend generally transversely to a longitudinal direction defined by the transmission shift cable.

27. The shifter assembly defined in claim 26 wherein the mating teeth extend in a direction generally parallel but at a slight angle to a pivot axis defined by the shift lever.

28. The shift assembly defined in claim 27 wherein leading edges of the mating teeth are generally pointed so that the mating teeth do not abut and prevent the coupler from moving to the interlocked position.

29. An apparatus comprising:
   a transmission shift lever constructed for operative attachment to a vehicle;
   a transmission shift control mechanism constructed for attachment to a vehicle transmission;
   an elongated member operably connecting the transmission shift lever to the transmission shift control mechanism, the elongated member having a predetermined length; and
   an adjuster on one of the transmission shift lever, the transmission shift control mechanism, and the elongated member; the adjuster including a coupler for securing the elongated member to one of the transmission shift lever and the transmission shift control mechanism in a secured/non-adjustable position, and further including an actuator for causing the coupler to move from an adjustment-permitting position to the secured/non-adjustable position, whereby the apparatus can be set in a properly adjusted position by operation of the actuator after attachment of the elongated member to the transmission shift lever and after attachment of the elongated member to the transmission shift control mechanism.

30. The apparatus defined in claim 29 wherein the elongated member comprises a telescopeable cable.

31. The apparatus defined in claim 30 wherein the actuator includes a camming surface for camming the coupler into the secured/non-adjustable position.

32. The apparatus defined in claim 31 wherein the coupler and the actuator are mounted on the shifter.

33. A shifting system comprising:
   a shift lever;
   a transmission control device for attachment to a vehicle transmission;

an elongated member operably connecting the shift lever and the transmission control device; and an adjuster on one of the shift lever, the transmission control device, and the elongated member; the adjuster being constructed to set an operating length of the elongated member after attachment of the shift lever to one end of the elongated member and after attachment of the transmission control device to another end of the elongated member, the adjuster including an actuator for moving the adjuster from an adjustment-permitting position to an interlocked/non-adjustable position from a location remote from the adjuster.

34. The shifting system defined in claim 33 wherein the elongated member includes a transmission shift cable.

35. The shifting system defined in claim 33 wherein the actuator includes a pull cord.

36. The shifting system defined in claim 33 wherein the actuator includes a cam and means for operating the cam.

37. The shifting system defined in claim 33 wherein the shift lever includes a pawl, and wherein the actuator is operably connected to the pawl for actuation when the pawl is moved.

38. The shifting system defined in claim 33 wherein the adjuster includes a coupling arm operably mounted on one of the shift lever and the transmission.

39. A method comprising:

providing a shift lever, a transmission control device, and an elongated member connected to the shift lever and the transmission control device;

providing an adjuster on one of the shift lever, the transmission control device, and the elongated member; and actuating the adjuster from a location remote from the adjuster to set the operating length of the elongated member after attaching the shift lever to one end of the elongated member and after attaching the transmission control device to another end of the elongated member.

* * * * *